United States Patent
Periyaeluvan et al.

(10) Patent No.: US 12,375,755 B2
(45) Date of Patent: Jul. 29, 2025

(54) QUICK STREAMING RECONNECT BY PRESERVING STREAMING CONTEXT ON APP EXIT

(71) Applicant: SLING MEDIA PVT LTD, Bangaluru (IN)

(72) Inventors: Rakesh Eluvan Periyaeluvan, Bangalore (IN); Jayaprakash Narayanan Ramaraj, Bangalore (IN)

(73) Assignee: DISH Network Technologies India Private Limited (IN)

( * ) Notice: Subject to any disclaimer, the term of this patent is extended or adjusted under 35 U.S.C. 154(b) by 0 days.

(21) Appl. No.: 16/934,065

(22) Filed: Jul. 21, 2020

(65) Prior Publication Data

US 2022/0030300 A1    Jan. 27, 2022

(51) Int. Cl.
*H04N 21/4367* (2011.01)
*H04L 65/1066* (2022.01)
*H04N 21/439* (2011.01)
*H04N 21/4402* (2011.01)
*H04N 21/443* (2011.01)

(52) U.S. Cl.
CPC ..... *H04N 21/4367* (2013.01); *H04L 65/1066* (2013.01); *H04N 21/4398* (2013.01); *H04N 21/440218* (2013.01); *H04N 21/443* (2013.01)

(58) Field of Classification Search
CPC ........... H04N 21/4367; H04N 21/4398; H04N 21/440218; H04N 21/443; H04L 65/1066
See application file for complete search history.

(56) References Cited

U.S. PATENT DOCUMENTS

| | | | |
|---|---|---|---|
| 2006/0265384 A1* | 11/2006 | Lee | G06F 16/40 |
| 2011/0302617 A1* | 12/2011 | Greenfield | H04N 7/17336 725/96 |
| 2014/0157136 A1* | 6/2014 | Bellumio | H04L 65/4084 715/738 |
| 2015/0237102 A1* | 8/2015 | Baccichet | H04L 65/765 709/204 |
| 2016/0173935 A1* | 6/2016 | Naik Raikar | H04N 21/4316 725/110 |
| 2017/0272792 A1* | 9/2017 | Bachmutsky | H04N 21/632 |
| 2017/0332210 A1* | 11/2017 | Iwami | H04W 92/18 |
| 2021/0212168 A1* | 7/2021 | Yoden | H04W 88/06 |

\* cited by examiner

*Primary Examiner* — Joshua D Taylor
(74) *Attorney, Agent, or Firm* — KW Law, LLP

(57) ABSTRACT

Presented here is a method and system of operating set-top boxes with clients in a network that includes configuring a set-top box (STB) to reconnect to a client that exits from a streaming session. The method includes executing a streaming data from the STB to the client and in response to the client exiting the streaming session, maintaining the streaming session in the active state after the client has exited. Further continuing to transcode audio/video data after the client has exited and relinquishing audio/video data that is continuously transcoded and received in the streaming session up until a defined period. Thereafter, upon receiving a request by the client to reconnect, identifying the client for reconnection to the exited client from the streaming session and linking the client seamlessly so the client resumes reception of the streamed data without any interruption in the transcode of the AV data.

16 Claims, 3 Drawing Sheets

QUICK STREAMING RECONNECT BY PRESERVING STREAMING CONTEXT ON APP EXIT

TECHNICAL FIELD

Embodiments of the subject matter described herein relate generally to the configuration and operation of networks of electronic devices such as a network that includes at least one streaming server and at least one related remote device. More particularly, embodiments of the subject matter relate to temporary storage and retrieval of identification data used for reconnecting to a streaming app as a result of an interrupt in the streamed data to the remote device.

BACKGROUND

The term "streaming video" generally refers to the reception of multimedia content, such as television programming and other audiovisual content, through a communications network at a bitrate enabling presentation of the content in real-time as it is received. Streaming video, in particular, is comparatively intolerant to delay and variations of throughput and delay. Streaming video may be viewed live or on-demand and transmitted by, for example, a Video On Demand (VOD) provider, a remotely-controlled placeshifting device, or a pay television provider delivering television programming via cable, satellite, or Internet (OTT) distribution channels. In the case of VOD or OTT television services, the media content may be stored in a pre-encoded format and distributed to a client media receiver, such as a mobile phone or STB, over a Content Delivery Network (CDN). Comparatively, in the case of placeshifted media, a DVR, STB, or a similar device having placeshifting capabilities and located within a user's residence may encode and transmit selected streaming video to a client media receiver, such as a mobile phone or tablet, operated by the end-user.

With data connectivity a major issue on mobile devices is that the hosted client must have the ability to recover from a lost connection. The client should attempt to recover a recoverable connection in a streaming session with a set-top box when a connection error is raised. During streaming, if the client exits a streaming session for any reason, then after the exit, and if the client is launched again; the client application would establish a fresh streaming connection to start the streaming. Establishing the fresh streaming connection will have its own delay to engage, restart components, and complete the previous occurring streaming pipeline of components Accordingly, it is desirable to have techniques, technology, network devices, and related operating methods that address the shortcomings of traditional network architectures in the client disconnect, attempt to reconnect, and restart process in a prior streaming session. In addition, there exists an ongoing demand for systems, methods, and devices capable of optimizing streaming of video-containing media content in a more efficient manner, while decreasing the likelihood of undesirably delays and interrupts and other conditions reducing the stability of streaming video session. Furthermore, other desirable features and characteristics will become apparent from the subsequent detailed description and the appended claims, taken in conjunction with the accompanying drawings and the foregoing technical field and background.

BRIEF SUMMARY

A method of configuring a video services receiver such as a set-top box for a quick reconnect operation for a client app that exits a streaming session in a network is presented here.

In a first embodiment, the method for configuring a set-top box (STB) to reconnect to a client that exits from a streaming session begins by establishing a data communication link between the STB and the client for streaming data by executing a streaming session to stream data from the STB to the client; continually transcoding data for streaming in the streaming session by keeping the streaming session in an active state; in response to an event causing the client to exit during execution of the streaming session, maintaining the streaming session in the active state to stream data for a defined period after the client has exited; in response to maintenance of the active state of the streaming session, continuing to transcode audio/video (AV) data after the client has exited by the STB for sending streaming data in the streaming session while the streaming session is kept in the active state wherein the STB relinquishes AV data that is continuously transcoded and received in the streaming session up until the defined period is completed; and thereafter, upon receiving a request by the client to reconnect to the STB, identifying by the STB that the client for reconnection corresponds to an exited client from the streaming session and linking the client seamlessly to the streaming session which the client exited so long as the streaming session is still receiving streamed data for the client to resume reception of the streamed data without any interruption in the transcode of the AV data.

In various exemplary embodiments, the method further includes in response to another client establishing a data communication link between the STB and requesting connection to the streaming session, treating another client as a new client, and not linking the another client to streaming session associated with a previous client. The method further includes establishing an initial data communication link between a previous client and the STB; and receiving the streaming data by the client in the streaming session by eliminating a step of having to restart a transcode engine for resumption of streaming data by STB in the streaming session. Further, the linking of the streaming session is executed immediately eliminating any latency caused by having to restart the transcode engine wherein the latency due to not having to restart the transcode engine is reduced by up to 2 seconds. The establishing step establishes a wireless data communication link between the STB and the client for the streaming session. The STB is configured to wirelessly receive identifier data of the client to determine whether to reconnect an executing streaming session based on client identifier data. The method includes in response to an event causing the client to disconnect during the executing of the streaming session, configuring the STB in a manner to not automatically clean an executing streaming session, and to create a new streaming session for connecting to an identified disconnected client. The method includes in response to a disconnect period exceeding a defined time for relinquishing the AV data by the STB, treating an identified disconnected client as a new client, and restarting the transcoding engine for streaming data to the identified disconnected client.

In another embodiment, a quick reconnect system to operate a client in a network is provided. The system includes a set-top box (STB) configured to receive client identifier data that is utilized by the STB to support data communication with the client on the network; a memory element coupled with the STB configured to store the client identifier data for use to administer control by the STB of executing a streaming session for streaming data from the STB to the client, wherein the STB further configured to: continually transcode data during for streaming data in executing streaming session by keeping the streaming session in an active state; in response to an event that causes the client to disconnect during executing of streaming session, maintain the active state for streaming data in the streaming session for a defined period; in response to maintenance of the streaming session active state, execute a continuous transcode of the audio/video (AV) data to produce streaming AV data during the streaming session active state and to relinquish transcoded AV data which is produced up to the defined period; and thereafter, upon a reconnect by the client, identify a disconnected client to reconnect and link a prior streamed session to exact a seamless handover in streaming data to the client without any interruption of a transcode process that is occurring and relating the previous streamed session to an identified disconnected client.

In various exemplary embodiments, the system includes: the STB configured to: in response to another client establishing a data communication link between the STB, treat another client as a new client and not linking the prior streamed session to another client by the STB. The system includes the STB configured to: establish an initial data communication link between a previous client and the STB; and receive the streamed data by the client without a restart of a transcoding engine of the STB again. The system includes the latency by not restarting the transcoding engine, is reduced by up to 2 seconds, which is caused by the latency of a transcoding engine restart. The system includes the STB is configured to: receive identifier data of the client to determine whether to reconnect the prior executing streaming session based on the client identifier data. The system includes the STB configured to: in response to an event causing the client to disconnect during the executing of the streaming session, configuring the STB in a manner to not automatically clean an executing streaming session, and to create a new streaming session for connecting to the disconnected client. The system includes the STB configured to: in response to a disconnect period that exceeds a defined time to relinquish the AV data, treat an identified disconnected client that attempts a reconnect as a new client and restart the transcode engine to stream data to the disconnected client wherein in the restart results in a delay in the reconnect of the disconnected client.

In yet another exemplary embodiment, a computer program product tangibly embodied in a computer-readable storage device that stores a set of instructions that when executed by a processor perform a method to execute a quick reconnect to stream data from a set-top box to a client is provided. The method includes establishing a data communication link between the STB and the client for streaming data in an executing streaming session from the STB to the client; continually transcoding data during for streaming data in the executing streaming session by keeping the streaming session in an active state; in response to an event causing the client to disconnect during executing of streaming session, maintaining, by the STB, the active state for streaming data in the streaming session for a defined period; in response to keeping the active state of the streaming session, continuously transcoding the audio/video (AV) data by the STB to send streaming data in an active state streaming session wherein the STB relinquishes transcoded AV data up to the defined period; and thereafter, upon reconnecting by the client, identifying by the STB a disconnected client for reconnecting the prior streaming session and for a seamless continuance in the streaming of data to the client without any interruption of the transcoding process by linking of the previous streaming session that is currently executing by the STB.

In various exemplary embodiments, the method further includes in response to another client establishing a data communication link between the STB, treating another client as a new client, and not linking the prior executing streaming session to another client by the STB. The method further includes establishing an initial data communication link between a previous client and the STB; and receiving the streaming data by the client without restarting a transcoding engine of the STB again. The method includes the linking of the streaming session being executed immediately eliminating any latency caused by having to restart the transcode engine wherein the latency due to not having to restart the transcode engine is reduced by up to 2 seconds. The method includes an establishing step establishes a wireless data communication link between the STB and the client for the streaming session, and wherein the STB is configured to wirelessly receive identifier data of the client to determine whether to reconnect the executing streaming session based on client identifier data.

This summary is provided to introduce a selection of concepts in a simplified form that is further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A complete understanding of the subject matter may be derived by referring to the detailed description and claims when considered in conjunction with the following figures, wherein like reference numbers refer to similar elements throughout the figures.

DETAILED DESCRIPTION

Figure 1:
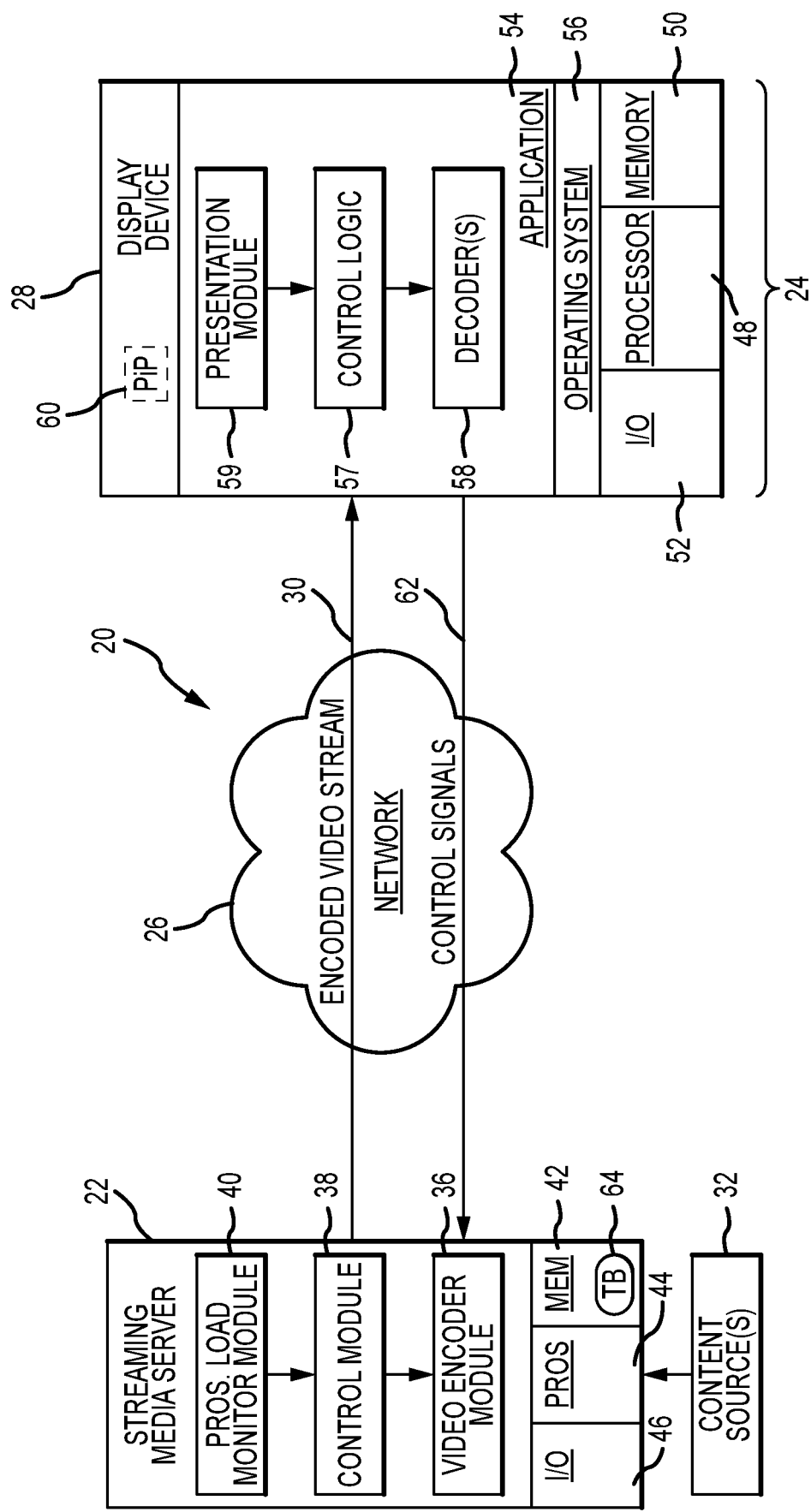
FIG. 1 is a schematic representation of an exemplary embodiment of a network that includes components and client devices.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. Moreover, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The techniques and technology described herein can be employed in the context of a network of devices that includes at least one controlled device and at least one controller device, where the controlled device and the controller device communicate with one another, and where the controller device controls at least one function, operation, or feature of the controlled device. Although the particular device platforms and device functionality need not be restricted or limited in any way, the exemplary embodiment described here relates to a network of devices associated with a video delivery system such as a cable television system, a satellite television system, a computer-based content delivery system, or the like. In this regard, the disclosed subject matter relates to certain features and functions of a video services receiver (such as an STB) and to certain features and functions of a client composed of client app and/or client device.

In various exemplary embodiments, the quick streaming reconnect system and method provides applications that enable distributed resiliency for the client app to reconnect a streaming session with paired set-top box or the like device streaming content to the client app. With a period of disconnection, the use of a reactive method by the client (i.e. client app) for the recovery data to a cache point or by restarting the transcoding engine can increase the transfer delay of a current streamed content because the entire current session is cleaned. The present disclosure describes a quick streaming reconnect method and system that improves the transfer delay with the data retrieval minimized by maintaining the current streaming session active for a defined period and then enabling the client to perform the reconnect. When the client connects back, the set-top box will identify the client by the client identifier and links the existing active session, which is currently kept active without dropping the transcoding AV data. Once the session link is completed in response to the reconnect request from the client, the set-top box will continue to send seamlessly without having to restart the transcode engine for producing streaming data to a client. If any other client connects, then the set-top box will identify a new client, and it will not link the existing active session. In this manner, the client immediately receives the streaming data without even restarting the transcoding engine. The result is that the latency in the reconnect is reduced up-to 2 seconds on streaming start.

In various exemplary embodiments, the quick streaming reconnect system and method can be implemented with AirTV® adapter that allows a user to view over-the-air television (TV) channels streamed to client applications for viewing on any TV in a house, or on tablets and smartphones inside and outside the home. Also, the quick streaming reconnect system and method can be implemented with connected client applications for over-the-air (OTA) products and services, including a 4K HDR compatible streaming stick that is powered by ANDROID TV™.

FIG. 1 schematically illustrates a streaming media system or network 20, including a streaming media server 22, which is suitable for applying the below-described processor load-responsive bitrate modification method during a streaming video session established between server 22 and at least one client media receiver 24. As depicted in FIG. 1, streaming media server 22 and, more broadly, streaming media system 20 are provided as generalized examples and should not be construed as limiting in any respect. In addition to streaming media server 22 and client media receiver 24, streaming media system 20 further includes a communications network 26 over which streaming video sessions are conducted. Communications network 26 may encompass any number of digital or other networks enabling bidirectional signal communication between server 22 and receiver 24 utilizing common protocols and signaling schemes. In this regard, communications network 26 can include one or more open CDNs, Virtual Private Networks (VPNs), Local Area Networks (LANs), Wide Area Networks (WANs), the Internet, and various other communications networks implemented in accordance with TCP/IP protocol architectures, User Datagram Protocol (UPD) architectures, or other communication protocols. In embodiments, communications network 26 may also encompass a cellular network and/or any other public or private networks.

During a given streaming video session, streaming media server 22 encodes, packetizes, and transmits streaming video content over communications network 26 to client media receiver 24. The streaming video content will typically, but need not necessarily include accompanying audio content. As the content is received, client media receiver 24 decrypts (if needed) and decodes the streaming video content (also referred to as a "video stream" or a "media stream" herein). Client media receiver 24 utilizes the newly-decoded content to generate corresponding video output signals, which are supplied to display device 28 for viewing by an end-user operating receiver 24. The video output signals may be transmitted within a single electronic device or system when client media receiver 24 and display device 28 are combined as a unitary device, such as a smartphone, laptop computer, tablet computer, wearable device, or smart television (that is, a television containing an integrated receiver). Alternatively, in embodiments in which device 28 is realized as an independent electronic device separate and apart from receiver 24, such as a freestanding television set or monitor, client media receiver 24 may output the video output signals as wired or wireless transmission, which is then forwarded to display device 28.

In various exemplary embodiments, the client media receiver 24 may be integrated with AirTV® Mini. For example, the AirTV Mini can be plugged into a television's HDMI port to launch with the SLING® TV app to view as an example streaming services such as NETFLIX®, which is integrated into the SLING® TV user interface. AirTV® Mini users also have access to the thousands of apps available from GOOGLE® Play. The streaming device, powered by ANDROID® TV, has the ability to integrate OTA channels when paired with the AirTV Wi-Fi-enabled network tuner and an OTA antenna. Additionally, AirTV Mini supports GOOGLE® Assistant via a dedicated button on the remote.

In certain instances, streaming media server 22 may encode, packetize, and transmit a single video-containing media stream 30 during the streaming video session. In other instances, and as indicated in FIG. 1, streaming media server 22 may concurrently transmit multiple video-containing media streams as, for example, a streaming channel bundle provided pursuant to an Over-the-Top (OTT) television service. In still other instances, streaming media server 22 may concurrently provide separate video streams to multiple streaming media receivers 24; e.g., as may occur when server 22 assumes the form of a consumer placeshifting device, which provides streaming content to multiple client devices (e.g., smartphones, tablets, televisions, or the like) located within a user's residence or similar area. Regardless of the number of streaming channels or video streams provided by server 22 to receiver 24 (or receivers 24) during a given streaming video session, the streaming video content can be obtained from any number and type of content sources 32 in communication with or included within streaming media server 22. Content sources 32 can include, for example, content providers and aggregators external to streaming media server 22 and in communication with server 22 over communications network 26. Additionally or alternatively, content sources 32 can include any number and type of storage mediums accessible to streaming media server 22 (e.g., contained within or operably coupled to server 22) in which the video content subject to streaming is stored.

As appearing herein, the term "streaming media server" is defined broadly to encompass any device or group of operably-interconnected devices capable of encoding video content at an ABR value, which repeated adjusted in response to variations in processor load (and other factors) in the manner described herein. In the illustrated embodiment, specifically, streaming media server 22 includes at least one video encoder module 36, which operates under the command of at least one control module 38. Additionally, streaming media server 22 also includes a processor load monitoring module 40. While generically illustrated as a separate module in FIG. 1, processor load monitoring module 40 can be combined with control module 38 in certain implementations. Modules 36, 38, 40 can be implemented utilizing any combination of hardware and software (including firmware) components. For example, modules 36, 38, 40 may be implemented utilizing software or firmware embodied by code or computer-readable instructions residing within memory 42 and executed by at least one processor 44 (e.g., a CPU) further included in server 22. As illustrated, memory 42 generally depicts the various storage areas or mediums (computer-readable storage mediums) contained in streaming media server 22 and may encompass any number and type of discrete memory sectors. In embodiments, processor 44 may be microprocessor, which is realized along with other non-illustrated components included in server 22 as a system-on-a-chip. Finally, it will be appreciated that streaming media server 22 may contain various other components known in the art including, for example, any number and type of Input/Output (I/O) feature 46 enabling bidirectional communication with client media receiver 24 and, perhaps, other nodes or devices over network 26.

Client media receiver 24 can assume various different forms, including, but not limited to, that of a mobile phone, a wearable device, a tablet, a laptop computer, a desktop computer, a gaming console, a DVR, or an STB. When engaged in a video streaming session with streaming media server 22, client media receiver 24 generates video signals for presentation on the display device 28. As indicated above, the display device 28 can be integrated into client media receiver 24 as a unitary system or electronic device. This may be the case when receiver 24 assumes the form of a mobile phone, tablet, laptop computer, a smart television, or similar electronic device having a dedicated display screen. Alternatively, the display device 28 can assume the form of an independent device, such as a freestanding monitor or television set, which is connected to client media receiver 24, such as a gaming console, DVR, STB, or another peripheral device, utilizing a wired or wireless connection. In such embodiments, the video output signals may be formatted in accordance with conventionally-known standards, such as S-video, High Definition Multimedia Interface ("HDMI"), Sony/Philips Display Interface Format ("SPDIF"), Digital Video Interface ("DVI"), or Institute of Electrical and Electronics Engineers (IEEE) 1394 standards.

By way of non-limiting illustration, client media receiver 24 is shown as containing at least one processor 48 configured to selectively execute software instructions, in conjunction with associated memory 50 and I/O features 52. I/O features 52 can include a network interface, an interface to mass storage, an interface to display device 28, and/or various types of user input interfaces. Client media receiver 24 may execute a software program or application 54 directing the hardware features of client media receiver 24 to perform the functions described herein. Application 54 suitably interfaces with processor 48, memory 50, and I/O features 52 via any conventional operating system 56 to provide such functionalities. Software application can be placeshifting application in embodiments wherein streaming media server 22 assumes the form of a STB, DVR, or similar electronic device having placeshifting capabilities and typically located within a user's residence. In some embodiments, client media receiver 24 may be implemented with special-purpose hardware or software, such as the SLING-CATCHER-brand products available from Sling Media Inc., currently headquartered in Foster City, Calif., and/or any other products.

With continued reference to FIG. 1, software application 54 suitably includes control logic 57 adapted to process user input, receive video-containing media stream 30 from streaming media server 22, decode the received media streams, and provide corresponding output signals to display device 28 in an above-described manner. Application 54 decodes video containing content stream 30 utilizing at least one decoding module 58, which may be implemented as specialized hardware or software executing on processor 48 in certain implementations. The decoded content is supplied to presentation module 59, which generates corresponding output signals transmitted to display device 28. In embodiments, presentation module 59 may also combine decoded programming to create a blended or composite image; e.g., one or more picture-in-picture (PIP) images 60 may be superimposed over a primary image generated on the display device 28.

To establish a streaming video session, streaming media server 22 receives an initial transmission from client media receiver 24 such as a set-top box (STB) via network 26. This initial transmission may include data identifying the content desirably streamed to client media receiver 24 and other information, such as data supporting authentication of the streaming media server 22 and client media receiver 24. Additionally, in embodiments wherein streaming media server, 22 assumes the form of a consumer placeshifting device, such as an STB or DVR located in the residence of an end-user, control commands or signals 62 may include instructions to remotely operate the placeshifting device, as appropriate. A streaming video session then ensues until termination by server 22 or receiver 24.

During the streaming session, the streaming media server 22 usefully determines, on a repeated or iterative basis, the setting or value at which to encode streaming media content 30. Streaming media server 22 can select the ABR value based upon a number of factors pertaining to network performance and system resources. More recently, ABR selection schemes have been developed that select ABR values based, at least in part, on the fill rates or contents of a transfer buffer contained in a streaming media server. An example of such a transfer buffer 64 is generically shown in FIG. 1 as included in memory 42 of streaming media server 22. Generally, in such a "buffer occupancy" approach, the ABR encoding value may be increased as transfer buffer 64 begins to deplete, has greater available capacity, or the like, and decreased as buffer 64 begins to fill, has lesser available capacity, or the like. Such measurements (the available capacity and fill rate of the buffer) are generally referred to herein as "buffer occupancy parameters." Such a buffer occupancy approach may provide a convenient, readily measurable manner in which to infer network capacity and behavior.

For this particular example, an STB in the network 20 may need to maintain and utilize network identifier data to support data communication with at least one other remote device of the network 20. Thus, the identifier data maintained by an STB may include data associated with one or more remote control devices paired with that STB, data associated with at least one other STB that operates in the network 20, and/or data associated with the network 20 (e.g., data related to the network arrangement, network architecture, network topology, network operating requirements, supported data communication protocols, and the like). Generally speaking, the identifier data (i.e., network configuration type data) describes, defines, specifies, or otherwise indicates, without limitation: the device topology of the network 20; the member devices within the network 20; the data communication protocols, technologies, and techniques supported by the STB; and wireless frequencies or channels supported by the STB for purposes of network communication. In this regard, the network configuration data might contain the address information of other devices in the network, which may be the "long" form of the address (e.g., the MAC address itself) or it may be a "short" address that is agreed upon by the devices when they communicate at the time that they are linked. The network configuration data can also include certain configuration information specific to a particular remote device. In certain implementations, for example, the network configuration data includes a user-generated "name" for the remote. Another piece of network configuration data is a "device ID" that is basically an index into a look-up table containing most of the other information for a specific remote device. Thus, the system can if needed store the device ID, which should be sufficient to enable the RF communications stack to determine which remote device it is communicating with), and in this case, to determine whether to reconnect to the remote device to a prior streaming session. Accordingly, an STB with knowledge of the appropriate network configuration data will be able to cooperate with the other remote devices (i.e., member devices) in the network 20 in the desired manner.

Figure 2:
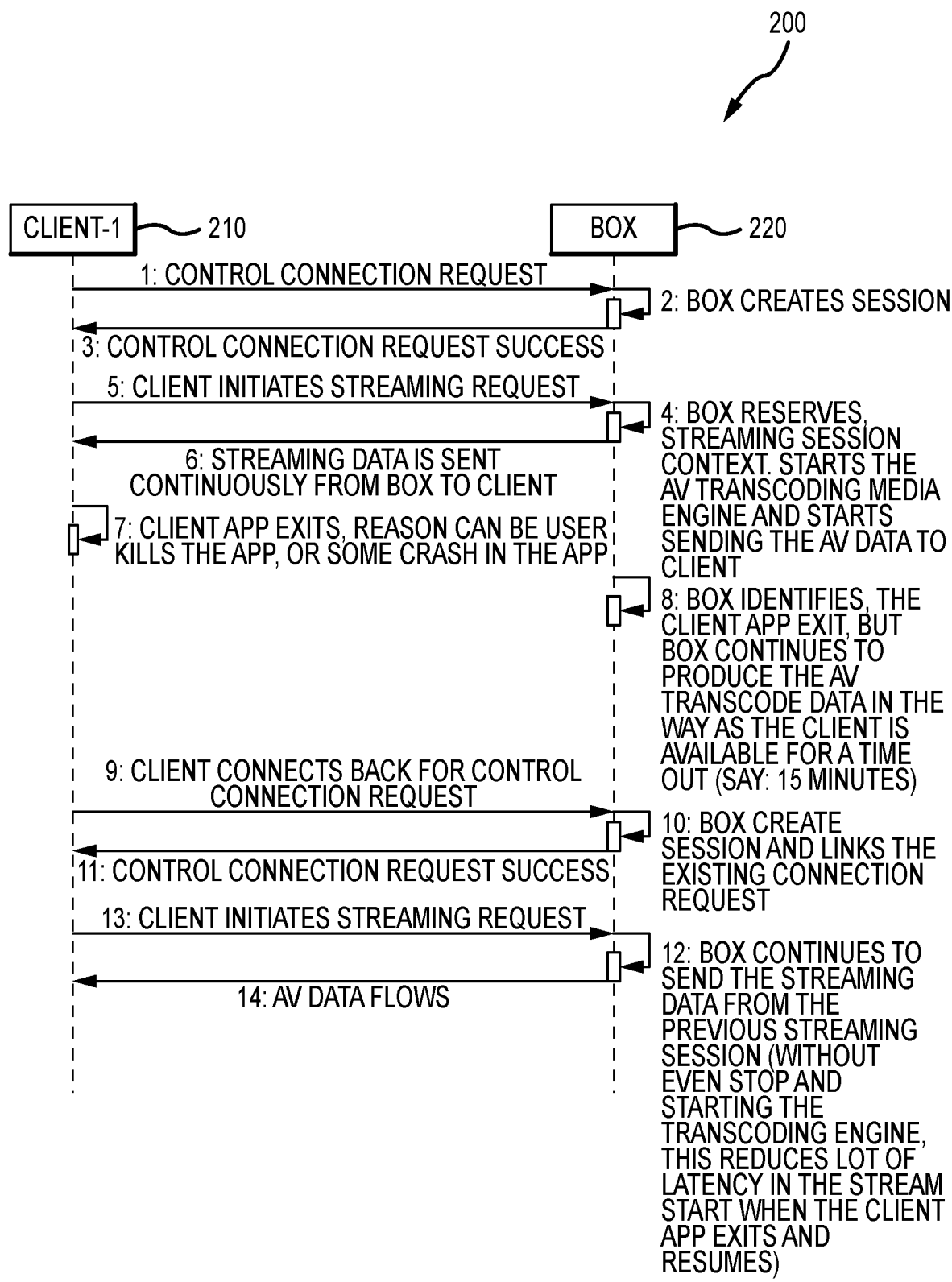
FIG. 2 is a flow diagram that illustrates an exemplary embodiment of requests and response for streaming data between a set-top box and client to execute the quick reconnect applications.

FIG. 2 is a flow diagram of the quick streaming reconnects system on a client app exit in accordance with an embodiment. Initially, the client-1 (210) sends a control connection request (Step 1) to the STB (220). At step 2, the STB creates a session and sends at step 3, a control connection request success to notify the client-1 (210) that the control connection request has been received and session has been created and paired to the client-1. In response, the client-1 (210) initiates a streaming request at step 5 to the STB (220). The STB 220 reserves (at step 4) a streaming session context and may also start the AV transcoding Media engine and start sending data to the client-1 (210). At step 6, the streaming data is sent continuously from the STB (220) to the client-1 (210). Next, the client at step 7, the client app exits, for example, this can occur for a number of reasons including the client "kills" the session or there is a forced disconnect caused by a stoppage of the streaming data, a crash of the app, reset of the app, etc. At step 8, the STB identifies the client app has exited the reserved session. Still, the STB continues to produce the AV transcode data (i.e., the backfill data) in the same manner for a limited time with the presumption that the client is available for a timeout (in this case, as an example a "15" minute timeout). At step 9, the client initiates a connect back type of request for the control connection to execute a replay of the streamed content. At step 10, the STB creates another session and links the existing connection request. At step 11, the STB 220 sends a control connection request success notification to the client-1 (210). The client, in response at step 13, initiates another streaming request. At step 12, the STB continues to send the streaming data from the previous streaming session (without pausing or stoppage of the transcoding engine, which reduces the latency that would normally occur at the start when the client app exits and resumes again). In other words, by storing the prior streaming segment that occurs in the exit and resumption steps of the client app, the delay, or latency in the time to restart and reconnect or resume, the streaming is either reduced or eliminated. Also, the reconnect occurs without having to restart the request from the beginning and repeat the portion of time covered prior to disconnecting, in other words, a resumption in the new session at the time of the disconnect. In addition, with the opening of the need session, this eliminates the need for redundancy in the architecture and no partitioning of the stream saving processor resources.

Figure 3:
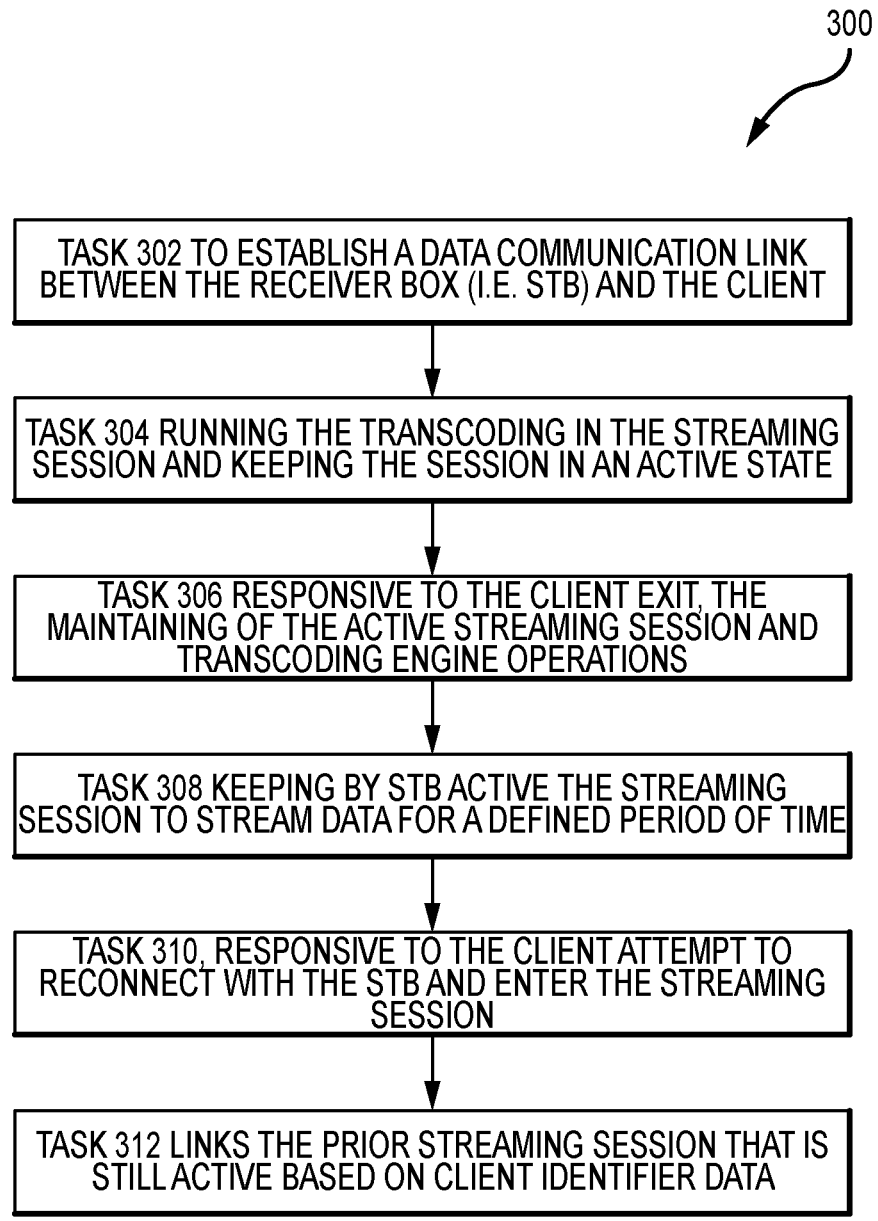
FIG. 3 is a flow diagram that illustrates an exemplary process for configuring the set-top box to execute the quick reconnect when a client exits a streaming session.

FIG. 3 is a flow diagram that illustrates an exemplary process 300 for configuring STB for a quick reconnect to the client that exits the streaming session in accordance with an embodiment. The various tasks performed in connection with the process 300 may be performed by software, hardware, firmware, or any combination thereof. For illustrative purposes, the following description of the process 300 may refer to elements mentioned above in connection with FIGS. 1 and 2. In practice, portions of the process 300 may be performed by different elements of the described system, e.g., an STB, a client, or the like. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

For ease of description, FIG. 3 corresponds to a simple example that contemplates interaction between an STB and client devices of the same network: an STB (labeled STB 220 in FIG. 2); and a remote client device (labeled client-1 in FIG. 2). Other devices in the network, such as additional client devices, are not shown in FIG. 2. The arrangement is shown in FIG. 3 is not limiting and, indeed, practical implementation will typically include more devices than only one STB and only one remote client, as explained above with reference to FIG. 1. It should be appreciated that the concepts presented here can be extended for use with other network arrangements and other scenarios.

The process 300 assumes that the STB and the client are already present in the network and have already been initialized and paired together for data communication within the network. The process 300 also assumes that the STB has already obtained the network configuration data that it utilizes to support data communication with the client. In practice, the first STB could obtain the network configuration data by communicating with one or more of the network client devices, by interacting with the user, via an online server or other data source, during a configuration or programming process at the vendor or manufacturer, or the like.

The process 300 may begin by establishing a data communication link between the STB (i.e. receiver box) and the client-1 (task 302). The data communication link may include a wireless link and/or a tangible link, as mentioned previously. This initial data communication link is used to stream data 306 from the STB to the client. At task 304, the STB is continually transcoding data during the streaming session by keeping the streaming session in an active state. At task 306, in response to the client exiting or disconnecting from the streaming session, the STB continues to maintain the streaming session in the active state and continues via its transcoding engine to transcode data sent to the client in the streaming session. At task 308, the STB keeps active the streaming session to stream data for a defined period of time. That is, in response to maintaining the active state in the streaming session, the STB continually transcodes audio/video (AV) data to send streaming data in the streaming session, and the STB relinquishes transcoded AV data up to the defined period. At task 310, in response to the client attempting to reconnect with the STB to enter the streaming session, the STB reconnects the prior streaming session, which is still continuously being sent streamed data by the STB to the disconnected client. This results in reconnecting the prior streaming session in a manner exhibiting a seamless continuance in the streaming of data to the client without any interruption of the transcoding process that results from the client's initial exit from the streaming session. Hence, the STB at task 312 links the prior streaming session that is still active (as the defined period of time has not been exceeded) and receiving streamed transcoded AV data from the transcoding engine of the STB. When the client connects back, the box will identify the client by the client identifier and links the existing active session, which is currently kept on dropping the transcoding AV data; once the session link is done, the box will continue to send the streaming data to a client. If any other client connects, then box will identify as new client and it will not link the existing active session. This way, the client immediately, get the streaming data without even starting the transcoding engine again. This way the latency would reduce up-to 2 seconds on streaming start.

Accordingly, the process 300 represents a convenient, user-friendly, and speedy methodology for reconnecting the exited client in the streaming that can be implemented in an existing network topology.

The process 300 can be modified and extended to contemplate other network topologies and other client exiting scenarios. For example, by implementing a configuration of the STB executing the streaming functionality and if the client app exits for any reason, the STB is configured not to clean-up the running streaming session; the STB will keep the streaming session active for defined timeout (i.e., 5, 7, 10 mins, etc.) and the transcoding engine will be remain active in the defined timeout. The STB is configured to continue dropping the AV data, which is being continually transcoded. These and other practical scenarios are contemplated by this foregoing description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system to communicate with a client via a network, the system comprising:
   an interface to the network;
   a processor;
   a non-transitory memory coupled with the processor, wherein the non-transitory memory is configured to store computer executable instructions that, when executed by the processor, cause the system to perform an automated process that comprises:
   establishing a data communication link between the system and the client via the network to support a streaming session that streams audio/video (AV) data from the system to the client, wherein the client provides a client identifier to the system to administer control of the streaming session;
   starting, by the system, to transcode the AV data at an adaptive bitrate (ABR) in a reserved context of the streaming session with the client while the streaming session is in an active state, wherein a transcode engine of the system writes data into a transfer buffer for transmission to the client, wherein the ABR is selected based on a fill rate or content of the transfer buffer;
   identifying, by the system, the client has exited the streaming session while the system transcodes the AV data;
   maintaining the streaming session in the active state for a defined period in response to identifying the client has exited the streaming session;
   continuing, by the system, to transcode the AV data in the streaming session for the defined period while the streaming session is active after identifying the client has exited the streaming session, wherein the system continually stores a recently-transcoded segment in the transfer buffer of the reserved context without transmitting the recently-transcoded segment during the defined period after the client has exited, wherein the system is configured to relinquish the recently-transcoded segment from the transfer buffer in response to a disconnect period exceeding the defined period; and
   receiving, by the system, a request by the client to reconnect to the system that includes the client identifier;
   identifying, by the system and based upon the client identifier, that the request for reconnection corresponds to the client that exited within the defined period from the streaming session that remains in the active state; and linking, by the system, the client to the streaming session in the active state thereby enabling the client to resume the streaming session without restarting the transcode engine, wherein upon linking to the client the system forwards the recently-transcoded segment from the transfer buffer.

2. The system of claim 1, wherein the system is further configured to:

in response to a second client establishing a data communication link between the system, treating the second client as a new client and not linking the streaming session to the second client.

3. The system of claim 2, wherein a latency by not restarting the transcoding engine, is reduced by up to 2 seconds, which is caused by the latency of a transcoding engine restart.

4. The system of claim 2, wherein the system is configured to:

receive the client identifier of the client to determine whether to reconnect the streaming session based on the client identifier.

5. The system of claim 2, wherein the system is configured to:

in response to an event causing the client to disconnect during the streaming session, configuring the system in a manner to not automatically clean the streaming session, and to create a new streaming session for connecting to the client.

6. The system of claim 1 wherein the AV data is transcoded during the streaming session linkable by the client identifier while the client is disconnected from the streaming session.

7. The system of claim 1 wherein, during the defined period, the system continually transcodes the AV data and stores a most-recently encoded segment of the AV data, wherein previously-stored encoded segments are dropped when the most-recently encoded segment is stored.

8. An automated process performed by a media device to deliver streaming media content to a client device via a network, the automated process comprising:

establishing a data communication link between the media device and the client device via the network to support a streaming session that streams the media content from the media device to the client device, wherein the client device provides a client identifier that is stored in a memory of the media device;

transcoding the media content at an adaptive bitrate (ABR) during the streaming session with the client device, wherein a transcode engine of the media device writes data into a transfer buffer while the streaming session with the client device is in an active state, wherein the ABR is selected based on a fill rate or content of the transfer buffer;

extending, by the media device, the transcoding the media content after the client device exits the streaming session, wherein the media devices stores a recently-transcoded segment of the media content in the transfer buffer of the streaming session without transmitting the recently-transcoded segment of the media content, wherein the media device is configured to relinquish the recently-transcoded segment from the transfer buffer in response to a disconnect period exceeding a predetermined period;

receiving, by the media device, a request to reconnect to the media device that includes the client identifier after the client device exits the streaming session;

identifying, by the media device and based upon the client identifier, that the request for reconnection corresponds to the client device that recently exited from the streaming session and that has a previously-established streaming session that remains in the active state; and relinking, by the media device, the client device to the same streaming session maintained in the active state, wherein the client device resumes reception of the transcoded media content stored by the media device in the transfer buffer, wherein upon relinking to the client device the media device immediately forwards the recently-transcoded segment of the media content from the transfer buffer without causing a restart of the transcode engine.

9. The automated process of claim 8, wherein the media content is a live television broadcast received and decoded by the media device.

10. The automated process of claim 9 wherein the extending comprises the media device continually transcoding a segment of the live television broadcast, storing the transcoded segment of the live television broadcast, transcoding a subsequent segment of the live television broadcast, and replacing the stored transcoded segment broadcast with the subsequent segment until either (i) a predetermined period of time has elapsed; or (ii) the client device receives the subsequent request to reconnect from the client device.

11. The automated process of claim 10 wherein the media content is transcoded during the streaming session linkable by the client identifier while the client device is disconnected from the streaming session.

12. The automated process of claim 8 wherein the extending comprises extending the streaming session for a predetermined period of time.

13. The automated process of claim 12 wherein the predetermined period of time is between five minutes and fifteen minutes.

14. The automated process of claim 12 wherein the predetermined period of time is fifteen minutes.

15. The automated process of claim 12 wherein, during the predetermined period, the media device continually transcodes the media content and stores the recently-transcoded segment of the media content, wherein previously-stored encoded segments are dropped when the recently-transcoded segment is stored.

16. An automated process performed by a system in communication with a client, the automated process comprising:

establishing a data communication link between the system and the client to support a streaming session that streams audio/video (AV) data from the system to the client, wherein the client provides a client identifier to the system to administer control of a reserved context of the streaming session;

starting, by the system, to transcode the AV data at an adaptive bitrate (ABR) in the reserved context of the streaming session with the client while the streaming session is in an active state, wherein the transcoding is performed by a transcode engine of the system for transmission to the client, wherein the ABR is selected based on a fill rate or content of the transfer buffer;

identifying, by the system, the client has exited the streaming session while the system transcodes the AV data;

maintaining the streaming session in the active state for a defined period in response to identifying the client has exited the streaming session;

continuing, by the system, to transcode the AV data at the ABR in the streaming session for the defined period while the streaming session is active after identifying the client has exited the streaming session, wherein the system continually stores a recently-transcoded segment in a transfer buffer without transmitting the recently-transcoded segment during the defined period after the client has exited, wherein the system is configured to relinquish the recently-transcoded segment from the transfer buffer in response to a disconnect period exceeding the defined period; and receiving, by the system, a request to connect to the system that includes the client identifier;

identifying, by the system and based upon the client identifier, that the request corresponds to the client that exited within the defined period from the streaming session that remains in the active state; and linking, by the system, the client to the streaming session in the active state thereby enabling the client to resume the streaming session without restarting the transcode engine, wherein upon linking to the client the system forwards from the transfer buffer the recently-transcoded segment that was transcoded in the streaming session while the client was disconnected from the streaming session.

\* \* \* \* \*